(12) United States Patent
Heyer et al.

(10) Patent No.: US 8,596,609 B2
(45) Date of Patent: Dec. 3, 2013

(54) SOLENOID VALVE

(75) Inventors: Klaus Heyer, Freiberg (DE);
Massimiliano Ambrosi, Marbach (DE);
Michael Eisenlauer, Affalterbach (DE);
Michael Rietsche, Ringsheim (DE);
Michael Tischer, Abstatt (DE); Stephan Steingass, Bornheim (DE); Michael Hilden, Obersulm-Eschenau (DE)

(73) Assignee: Robert Bosch GmbH, Stuttgart (DE)

( * ) Notice: Subject to any disclaimer, the term of this patent is extended or adjusted under 35 U.S.C. 154(b) by 244 days.

(21) Appl. No.: 12/668,595

(22) PCT Filed: Jul. 2, 2008

(86) PCT No.: PCT/EP2008/058469
§ 371 (c)(1),
(2), (4) Date: May 6, 2010

(87) PCT Pub. No.: WO2009/007278
PCT Pub. Date: Jan. 15, 2009

(65) Prior Publication Data
US 2010/0301246 A1    Dec. 2, 2010

(30) Foreign Application Priority Data
Jul. 10, 2007   (DE) .......................... 10 2007 031 981

(51) Int. Cl.
*B60T 8/36*     (2006.01)
*F16K 31/02*     (2006.01)

(52) U.S. Cl.
USPC ................. 251/129.05; 251/129.15; 251/337; 303/119.2

(58) Field of Classification Search
USPC .......... 251/129.15, 129.18, 337, 276, 129.05; 303/119.2
See application file for complete search history.

(56) References Cited

U.S. PATENT DOCUMENTS

| 4,635,683 | A | * | 1/1987 | Nielsen ..................... 137/625.65 |
| 5,509,396 | A | * | 4/1996 | Tamaki ......................... 123/400 |
| 6,113,066 | A | * | 9/2000 | Hohl et al. ............... 251/129.02 |

(Continued)

FOREIGN PATENT DOCUMENTS

| DE | 19751240 A1 | 5/1999 |
| DE | 10153886 A1 | 7/2002 |

(Continued)

*Primary Examiner* — Eric Keasel
(74) *Attorney, Agent, or Firm* — Maginot, Moore & Beck (57) ABSTRACT

The invention relates to a solenoid valve with a magnet assembly and a valve cartridge having a pole core, a valve insert connected to the pole core, an armature which is guided within the valve insert in an axially movable manner between a closed position and an open position and is coupled to a closing element, and a valve body which is connected to the valve insert and has a main valve seat which is arranged between at least one first flow opening and a second flow opening. The axially movable armature, when the magnet assembly is energized, is moved by a generated magnetic force within the valve insert in the direction of the pole core counter to a spring force of a resetting spring and counter to a fluid force in order to lift the closing element out of the main valve seat; and to permit a flow of fluid between the at least one first flow opening and the second flow opening. The axially movable armature is moved away from the pole core by the spring force of the restoring spring and by the fluid force within the valve insert in order to press the closing element into the main valve seat in a sealing manner and to interrupt the fluid flow between the at least one first flow opening and the second flow opening.

18 Claims, 7 Drawing Sheets

(56) References Cited

U.S. PATENT DOCUMENTS

| | | | |
|---|---|---|---|
| 6,367,283 B1 * | 4/2002 | Enderle | 62/511 |
| 6,422,259 B1 | 7/2002 | Moreno | |
| 6,755,390 B2 * | 6/2004 | Masuda et al. | 251/30.03 |
| 6,789,779 B2 * | 9/2004 | Sickinger et al. | 251/129.15 |
| 6,805,331 B2 * | 10/2004 | Burrola et al. | 251/129.15 |
| 6,814,339 B2 * | 11/2004 | Berger et al. | 251/129.1 |
| 6,957,663 B2 * | 10/2005 | Hirota et al. | 137/613 |
| 7,036,788 B1 * | 5/2006 | Schneider et al. | 251/86 |
| 7,047,763 B2 * | 5/2006 | Hirota | 62/527 |
| 2005/0001190 A1 | 1/2005 | Shirase et al. | |

FOREIGN PATENT DOCUMENTS

| | | |
|---|---|---|
| EP | 0717219 A1 | 6/1996 |
| EP | 1484539 A1 | 12/2004 |
| WO | 0136243 A1 | 5/2001 |

* cited by examiner

Fig. 5

SOLENOID VALVE

CROSS-REFERENCE TO RELATED APPLICATION

This application is a 35 USC 371 application of PCT/EP2008/058469 filed on Jul. 2, 2008.

BACKGROUND OF THE INVENTION

1. Field of the Invention

The invention relates to a solenoid valve.

2. Description of the Prior Art

Figure 1:
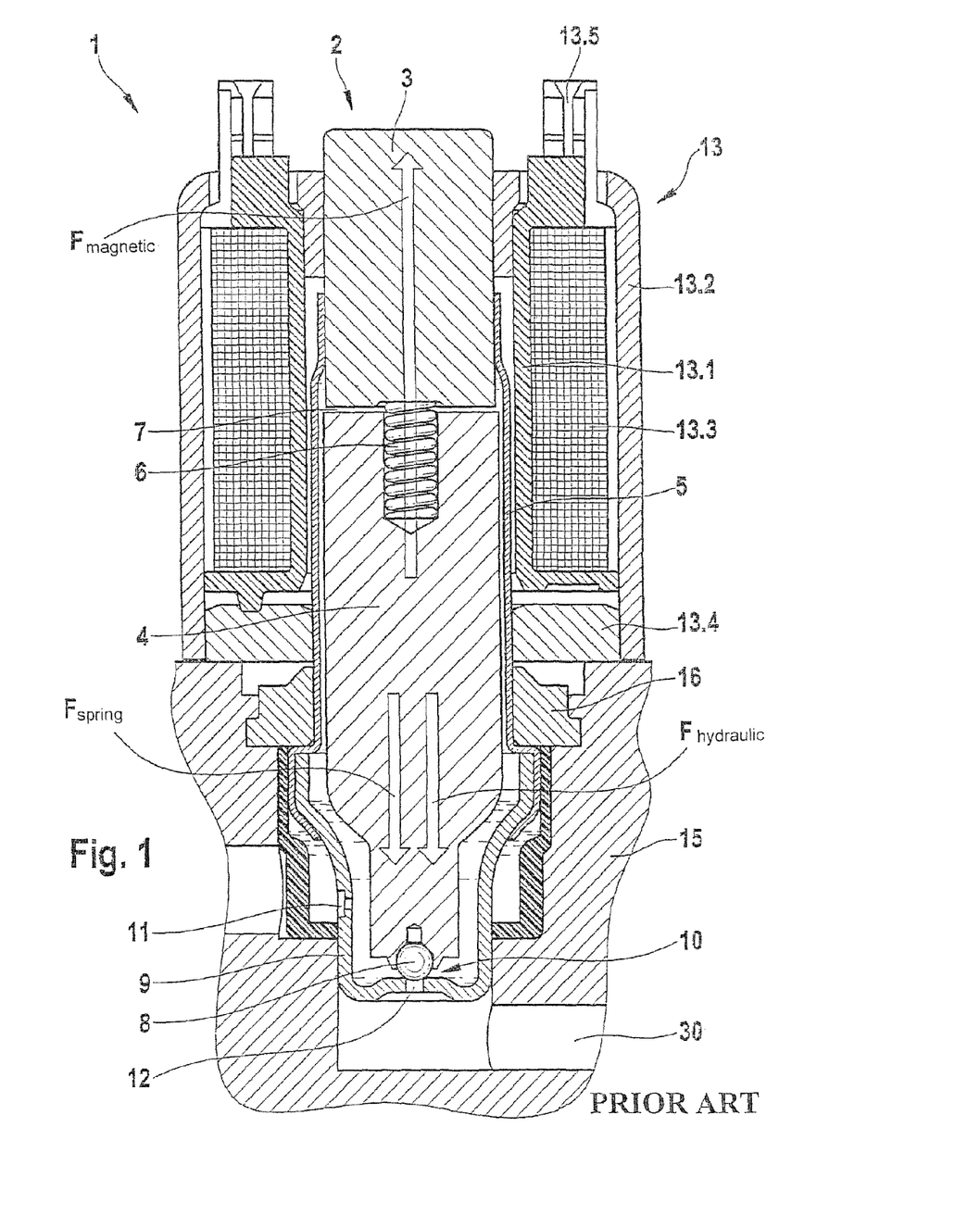
FIG. 1 shows a schematic sectional view of a conventional solenoid valve that is closed when without current.

A conventional solenoid valve, particularly for a hydraulic unit which is used for instance in an anti-lock brake system (ABS) or a traction control system (TC system) or an electronic stability program system (ESP system), is shown in FIG. 1. As can be seen from FIG. 1, a conventional solenoid valve 1, which is closed when without current and which is embodied as an on-off valve, includes a valve cartridge 2 and a magnet assembly 13. The valve cartridge 2 includes a pole core 3, a valve insert 5 connected to the pole core 3 and embodied as a sleeve, an armature 4 guided axially movably inside the valve insert 5 between a closed position and an open position, which armature is coupled with a closing element 8, and a valve body 9, connected to the valve insert 5, with a main valve seat 10 that is disposed between at least one first flow opening 11 and a second flow opening 12. The valve body 9 is likewise embodied as a sleeve. The magnet assembly 13 includes a winding holder 13.1, a housing jacket 13.2, a coil winding 13.3 with electrical terminals 13.5, and a cover disk 13.4. The axially movable armature 4, when current is supplied to the magnet assembly 13, or in other words when current is applied to the coil winding via the electrical terminals 13.5, is moved counter to the pole core 3 by a generated magnetic force $F_{magnetic}$ inside the valve insert 5 counter to a spring force $F_{spring}$ of a restoring spring 6 and counter to a fluid force $F_{hydraulic}$, in order to lift the closing element 8 out of the main valve seat 10 and to enable a fluid flow between the at least one first flow opening 11 and the second flow opening 12. The maximum possible stroke of the armature 4 and of the closing element 8 is specified by the air gap 7 between the pole core 3 and the armature 4. In order to press the closing element 8 sealingly into the main valve seat 10 and to interrupt the fluid flow between the at least one first flow opening 11 and the second flow opening 12, the axially movable armature 4 with the closing element 8 is moved away from the pole core 3 in the direction of the main valve seat 10 by the spring force $F_{spring}$ of the restoring spring 6 and by the fluid force $F_{hydraulic}$ inside the valve insert 5. The pole core 3 is connected in fluid-tight fashion to the valve insert 5, for instance by means of a weld seam. Moreover, the solenoid valve 1 shown is calked via a calking flange 16 to a fluid unit block 15. The action directions of the spring force $F_{spring}$, fluid force $F_{hydraulic}$, and magnetic force $F_{magnetic}$ are indicated by arrows in FIG. 1.

Until now, outlet valves in the ABS/ESP system have been embodied purely as on-off valves, which can be operated in quasi-stationary fashion as only fully open or fully closed. The outlet valve, as a noncontinuous on-off valve, typically experiences a flow through it in a stroke-closing direction. This is done in the context in which high wheel pressures reinforce the valve tightness. Thus only slight initial spring tensions suffice, which permits a lower total force level and thus allows fast valve reactions.

Compared to on-off valves, continuous valves have the advantage that by adjustment of partial strokes between the fully closed and the fully open position, arbitrarily adjustable intermediate positions can be established, and thus arbitrary flow cross sections can be opened, and arbitrary flow quantities through the valve can be established. For the valves of an ABS/ESP system, this means for instance that the buildup and reduction gradients of a wheel pressure can be adjusted variably, and as a result the meterability of the wheel pressure can be improved and the noise-generating pressure fluctuations can be reduced. A continuous valve through which the flow is in the opening direction, however, requires a high initial spring tension for sealing off a requisite wheel pressure, such as a locking pressure level. However, as a result the total force level also becomes quite high, which when current is supplied to the magnet assembly leads to high current intensities and is disadvantageous with regard to the valve reaction times, current adjustment precision, and the thermal performance.

ADVANTAGES AND SUMMARY OF THE INVENTION

The solenoid valve of the invention has the advantage that the stroke-dependent courses of the magnetic force, the spring force, and the fluid force are combined over the stroke course of the armature and of the closing element in such a way that between the closed position and the open position of the armature and of the closing element, at least one further stable operating point can be established, which represents a point of force equilibrium with a negative total force gradient. Because of the special selection of the courses of the spring force, magnetic force and fluid force as a function of the valve stroke, it is possible, in a solenoid valve designed as an on-off valve which experiences a flow through it in the closing direction, to establish stable operating points and thus to operate it as a continuous valve. Thus the solenoid valve of the invention has the advantages of continuous valves while simultaneously maintaining the advantages, such as tightness at arbitrary high pressures, fast valve reactions, and a low total force level, of an on-off valve that has a flow through it in the closing direction.

It is especially advantageous that the course of the magnetic force, effected by supplying current to a magnet assembly of the solenoid valve of the invention, over the stroke course of the armature and of the closing element between the closed position and the open position is adjusted to be as flat as possible by means of specifying geometries for the armature and the pole core. To enable establishing arbitrary pressure reduction ramps with the solenoid valve of the invention, the electric current for supplying the magnet assembly can be regulated with a valve current regulator, for instance as a function of a pressure sensor signal. Moreover, the current intensity for supplying the magnet assembly can be established without a pressure sensor as well. For instance, the armature can be moved with the closing element by a partial stroke, by adjustment of the current intensity for supplying current to the magnet assembly, in order to lift the closing element out of the main valve seat and to operate the solenoid valve in a quasi-stationary, partly open state. The current intensity can be adjusted by specification of a pulse width modulation ratio (PWM ratio), for instance for a brief pulse time. Thus the solenoid valve of the invention, in contrast to an on-off valve, can be opened not fully but instead only up to a certain partial stroke, which is variable by means of the adjusted current intensity. Thus more finely-meterable pressure reduction stages are possible than in a purely on-off valve, and as a result, the noise behavior can be improved as well.

In a feature of the solenoid valve of the invention, the armature is for instance embodied as a solenoid plunger, which with a correspondingly embodied pole core forms a single-stage or multi-stage plunger stage. Alternatively, the armature can be embodied as a flat armature that cooperates with a pole core which has a flat pole face. However, in this embodiment, the corresponding magnetic force has a flat course only beyond a specified width of an air gap between the armature and the pole core.

In a further feature of the solenoid valve of the invention, the restoring spring, for furnishing the spring force, has a high spring constant. The restoring spring for instance has a linearly designed spring characteristic curve, with a constant spring rate.

Since with an increasing stroke and a decreasing size of air gap, the magnetic force and in particular the gradient of the magnetic force as well rise over the stroke, which limits the adjustable range to smaller strokes, the restoring spring can alternatively be embodied such that the spring force furnished by the restoring spring has a progressive course over the stroke course of the armature and of the closing element. This means that the spring rate of the restoring spring is varied as a function of the stroke of the armature and of the closing element between the closed position and the open position. As a result of the progressive course of the spring force, the stability behavior of the armature with the closing element can be improved, and the stable operating range can be broadened; the progressive course of the spring force overcompensates for the magnetic force gradient that rises with the stroke. The progressive spring force course of the restoring spring advantageously generates the negative total force gradient over an increased stroke range. Moreover, the lower spring rates at short strokes make greater tolerance in the components possible, which makes mass production easier.

In a further feature of the solenoid valve of the invention, the course of the fluid force, effected by the fluid flow between the first flow opening and the second flow opening, is adjusted to be as flat as possible over the stroke course of the armature and of the closing element, by means of flow geometry specifications for the closing element and the main valve seat. The flat course of the fluid force over the stroke course of the armature and of the closing element can be specified for instance by a small opening angle between the closing element and the main valve seat. For that purpose, a sealing region of the closing element can be embodied for instance as a ball or as a cone, while a sealing region of the main valve seat is embodied as a hollow cone.

Advantageous embodiments of the invention, described below, as well as the conventional exemplary embodiments described above for better comprehension of the invention, are shown in the drawings. In the drawings, identical reference numerals indicate components and elements that perform the same or analogous functions.

DESCRIPTION OF THE PREFERRED EMBODIMENTS

Figure 4:
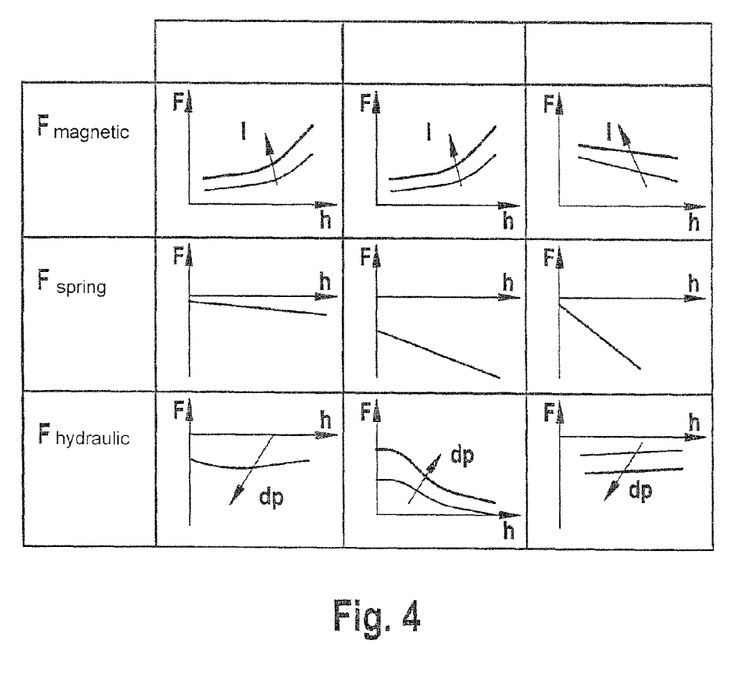
FIG. 4 shows a plurality of graphs of variable courses of the forces of conventional solenoid valves and solenoid valves according to the invention.

As can be seen from the graphs in FIG. 4, a conventional solenoid valve, valve 1, embodied as an on-off valve with a flow through it in the stroke-closing direction h has the schematic courses shown in column 1 of the magnetic force $F_{magnetic}$, the spring force $F_{spring}$, and the fluid force $F_{hydraulic}$. A conventional solenoid valve, valve 2, embodied as a continuous valve with a flow through it in the stroke-opening direction h has the schematic courses shown in column 2 of the magnetic force $F_{magnetic}$, the spring force $F_{spring}$, and the fluid force $F_{hydraulic}$. As can be seen from column 3, the course of the force of the magnetic force $F_{magnetic}$ should be as flat as possible over the stroke. The restoring spring should be embodied as stiffly as possible; that is, the restoring spring 26 (FIG. 2a) should have a high spring stiffness. The course of the fluid force $F_{hydraulic}$ over the stroke should also be as flat as possible. The schematic courses of the magnetic force solenoid valve, the spring force $F_{spring}$, and the fluid force $F_{hydraulic}$ shown, dependent on the stroke course of an armature and of a closing element, are combined according to the invention in such a way that between the closed position and the open position of the armature and of the closing element, at least one further stable operating point can be established, which represents a point of force equilibrium with a negative total force gradient. The total force gradient for the solenoid valve of the invention is obtained from equation (1):

$$\frac{\partial F_{total}}{\partial h} = \frac{\partial \sum F_{opening}}{\partial h} - \frac{\partial \sum F_{closing}}{\partial h} \qquad (1)$$
$$= \frac{\partial F_{magnetic}}{\partial h} - \left[\frac{\partial F_{spring}}{\partial h} + \frac{\partial F_{hydraulic}}{\partial h}\right]$$

Figure 2A:
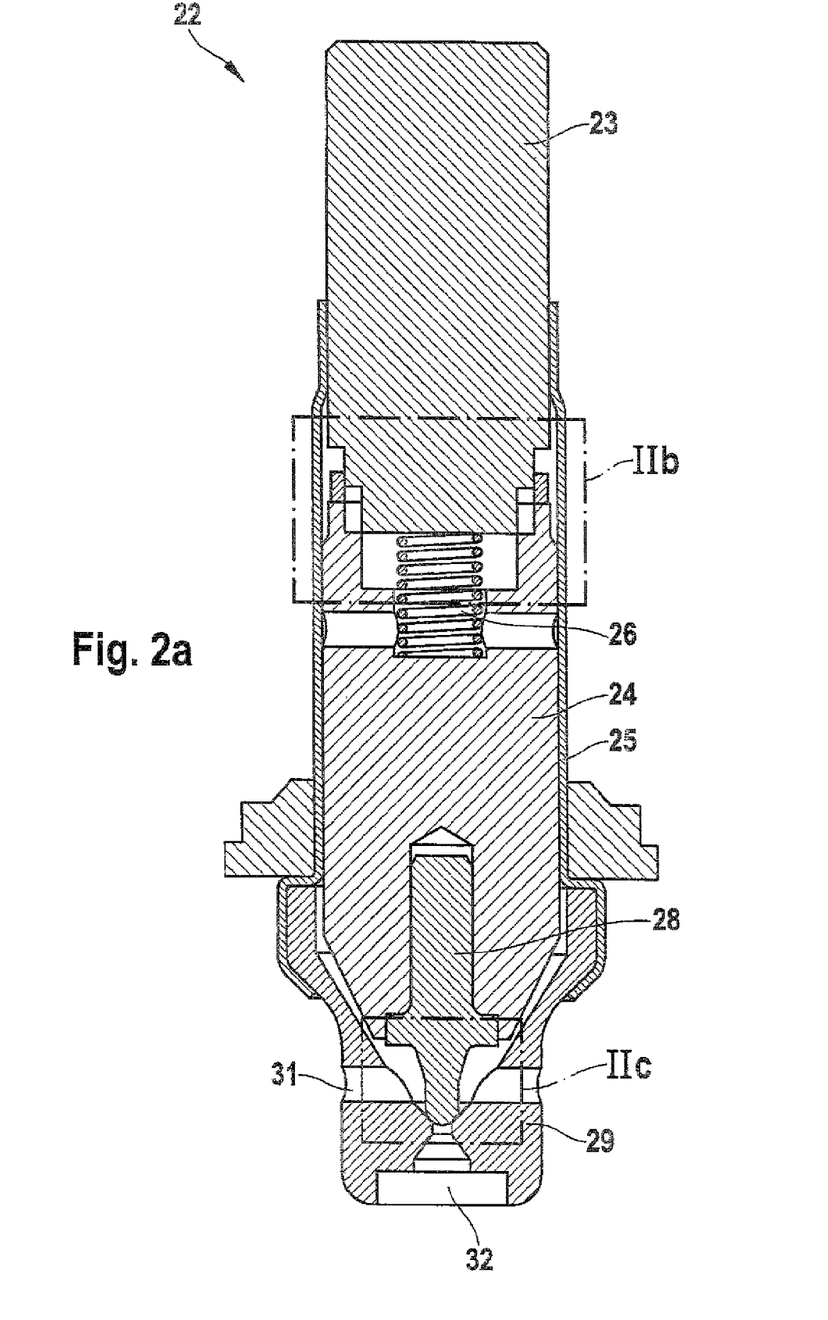
FIGS. 2a through 2c show schematic sectional views of a first exemplary embodiment of a valve cartridge of a solenoid valve of the invention that is closed when without current.
Figure 2B:
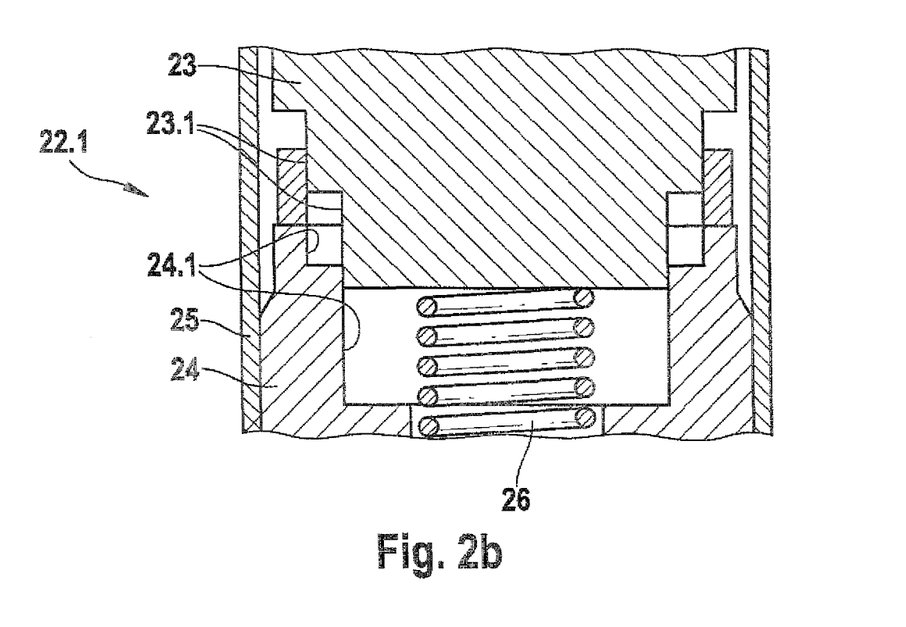
Figure 2C:
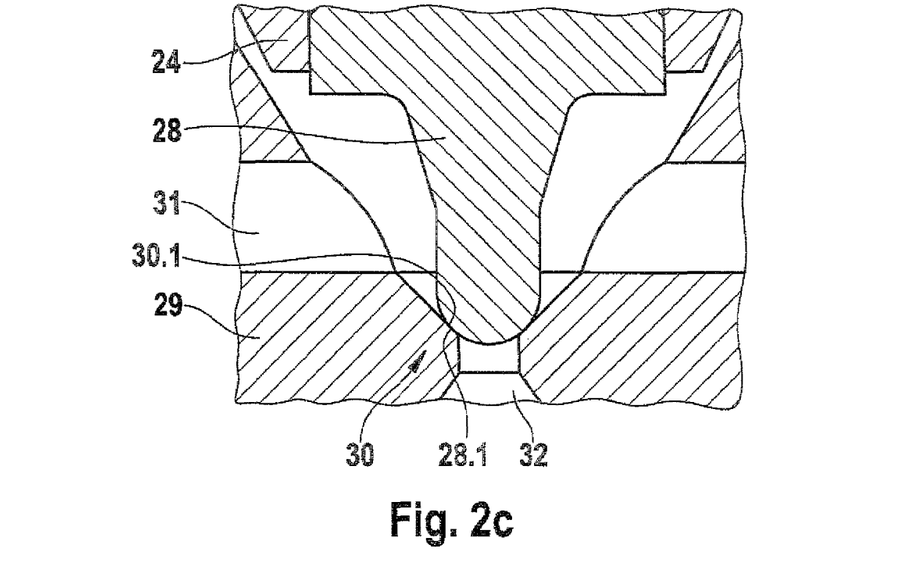

As can be seen from FIGS. 2a through 2c, analogously to the conventional solenoid valve 1 shown in FIG. 1, a first exemplary embodiment of a valve cartridge 22 for a solenoid valve according to the invention, has a pole core 23, a valve insert 25 connected to the pole core 23, an armature 24 guided axially movably between a closed position and an open position and coupled with a closing element 28, and a valve body 29, connected to the valve insert 25, with a main valve seat 30 (FIG. 2c) that is disposed between at least one first flow opening 31 and a second flow opening 32. For generating the magnetic force $F_{magnetic}$ that moves the axially movable armature 24 with the closing element 28 inside the valve insert 25 counter to the spring force $F_{spring}$ of a restoring spring 26 and counter to the fluid force $F_{hydraulic}$ in the direction of the pole core 23, the magnet assembly 13 shown in FIG. 1 can be employed. As a result of the magnetic force $F_{magnetic}$ generated upon a supply of current to the magnet assembly, the armature 24 is moved in the direction of the pole core 23, and the closing element 28 is lifted out of the main valve seat 30, so that a fluid flow can be established between the at least one first flow opening 31 and the second flow opening 32. By the spring force $F_{spring}$ of the restoring spring 26 and the fluid force $F_{hydraulic}$, which is engendered by pressure distributions effected by the fluid flow between the first flow opening 31 and the second flow opening 32 at the armature 24 and the closing element 28, the armature 24 can be moved inside the valve insert 25 away from the pole core 23, in order to press the closing element 28 sealingly into the main valve seat 30 and to interrupt the fluid flow between the at least one first flow opening 31 and the second flow opening 32. The stroke-dependent courses of the magnetic force $F_{magnetic}$, the spring force $F_{spring}$ and the fluid force $F_{hydraulic}$ are generated by geometric specifications for the armature 24 and the pole core 23, by the embodiment of the restoring spring 26, and by geometric specifications for the flow course between the first flow opening 31 and the second flow opening 32.

As can be seen from the detailed view in FIG. 2b, the armature is embodied as a solenoid plunger 24, which with a correspondingly embodied pole core 23 forms a two-stage plunger stage 22.1. As can also be seen from FIG. 2b, the solenoid plunger 24 has two armature stages 24.1, and the pole core 23 has two corresponding pole core stages 23.1 that plunge into the armature stages 24.1. Because of the embodiment as a two-stage plunger stage 22.1, the course of the magnetic force $F_{magnetic}$, effected by the supply of current to the magnet assembly 13, over the stroke course of the armature 24 and of the closing element 28 is adjusted to be as flat as possible, as is desired. In an alternative embodiment, not shown, the armature is embodied as a flat armature, which cooperates with a pole core that has a flat pole face. However, in this alternative embodiment, the corresponding magnetic force does not have a flat course until beyond a specified width of an air gap between the armature and the pole core.

As can be seen from the detailed view in FIG. 2c, a sealing region 28.1 of the closing element 28 is embodied as a hemispherical ball, and a sealing region 30.1 of the main valve seat 30 is embodied as a hollow cone. By means of this embodiment, in this exemplary embodiment, a small opening angle between the closing element 28 and the main valve seat 30 can be specified, which here for instance makes the desired flat course of the fluid force $F_{hydraulic}$ possible over the stroke course of the armature 24 and the closing element 28 between the closed position and the open position.

Figure 3A:
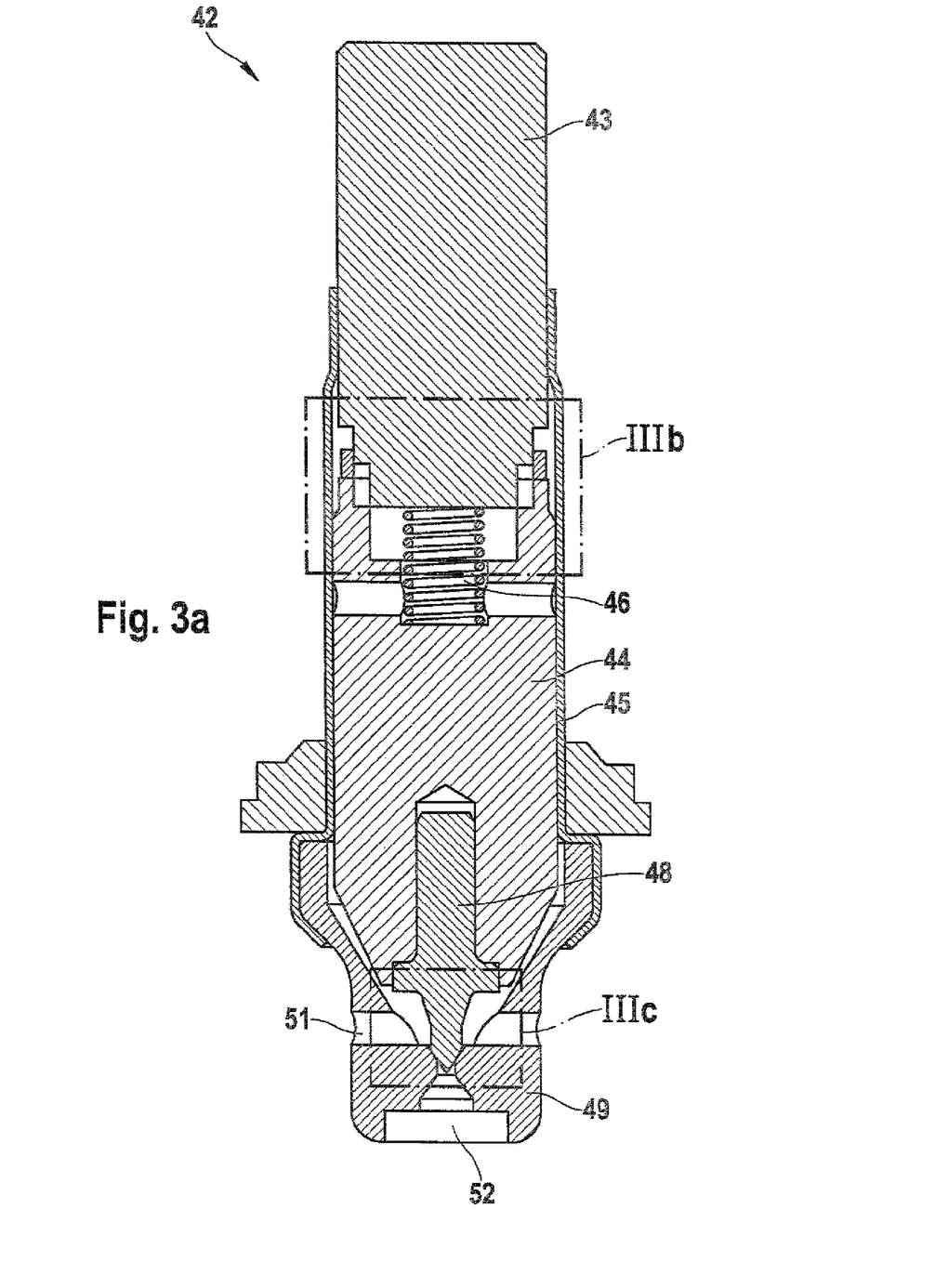
FIGS. 3a through 3c show schematic sectional views of a second exemplary embodiment of a valve cartridge of a solenoid valve of the invention that is closed when without current.
Figure 3B:
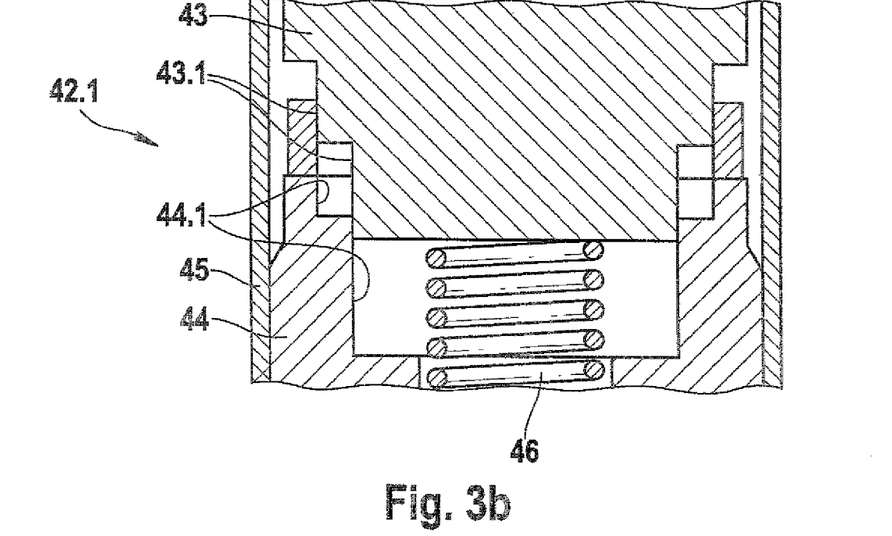
Figure 3C:
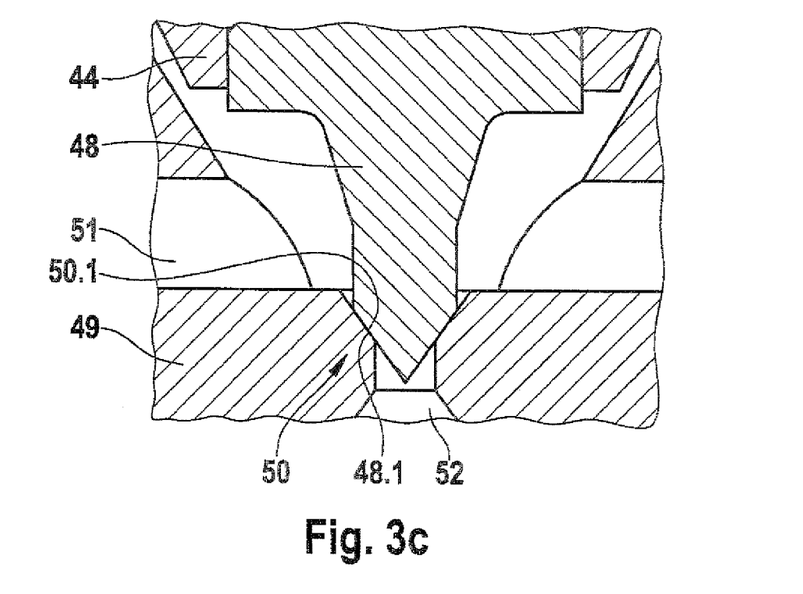

As can be seen from FIGS. 3a through 3c, a second exemplary embodiment of a valve cartridge 42 for a solenoid valve according to the invention, analogously to the first exemplary embodiment of the valve cartridge for a solenoid valve of the invention, shown in FIGS. 2a through 2c, includes a pole core 43, a valve insert 45 connected to the pole core 43, an armature 44 guided axially movably between a closed position and an open position and coupled with a closing element 48, and a valve body 49, connected to the valve insert 45, with a main valve seat 50 (FIG. 3c) that is disposed between at least one first flow opening 51 and a second flow opening 52. For generating the magnetic force $F_{magnetic}$, the magnet assembly shown in FIG. 1 can also be employed. Analogously to the first exemplary embodiment, the stroke-dependent courses of the magnetic force $F_{magnetic}$, the spring force $F_{spring}$ and the fluid force $F_{hydraulic}$ are generated by geometric specifications for the armature 44 and the pole core 43, by the embodiment of the restoring spring 46, and by geometric specifications for the flow course between the first flow opening 51 and the second flow opening 52.

As can be seen from the detailed view in FIG. 3b, the armature of the second exemplary embodiment is embodied as a solenoid plunger 44, which with a correspondingly embodied pole core 43 forms a two-stage plunger stage 42.1. As can also be seen from FIG. 3b, the solenoid plunger 44 has two armature stages 44.1, and the pole core has two corresponding pole core stages 43.1 that plunge into the armature stages 44.1. Because of the embodiment as a two-stage plunger stage 42.1, the course of the magnetic force $F_{magnetic}$, effected by the supply of current to the magnet assembly 13, over the stroke course of the armature 44 and of the closing element 48 is adjusted to be as flat as possible, as is desired.

As can be seen from the detailed view in FIG. 3c, a sealing region 48.1 of the closing element 48 is embodied as a cone, and a sealing region 50.1 of the main valve seat 50 is embodied as a hollow cone. By means of this embodiment, similarly to the first exemplary embodiment, a small opening angle between the closing element 48 and the main valve seat 50 can be specified, which here again for instance makes the desired flat course of the fluid force $F_{hydraulic}$ possible over the stroke course of the armature 44 and the closing element 48 between the closed position and the open position.

For both exemplary embodiments of the solenoid valve of the invention, the restoring spring 26, 46 for furnishing the spring force $F_{spring}$ has a high spring rate and thus high rigidity. A particular advantage is obtained if the spring force $F_{spring}$ furnished by the restoring spring 26, 46 has a progressive course over the stroke course of the armature 24, 44 and of the closing element 28, 48.

By the selection of a restoring spring 26, 46 with a progressive course of the spring force $F_{spring}$, the stability behavior of the solenoid valve of the invention can be improved, and the stable operating range with a negative total force gradient can be broadened. The magnetic force gradient that rises with the stroke is overcompensated for by the progressive course of the spring force $F_{spring}$. In addition, the lower spring rates at short strokes make a higher tolerance of the components possible, which advantageously makes mass production easier.

Figure 5:
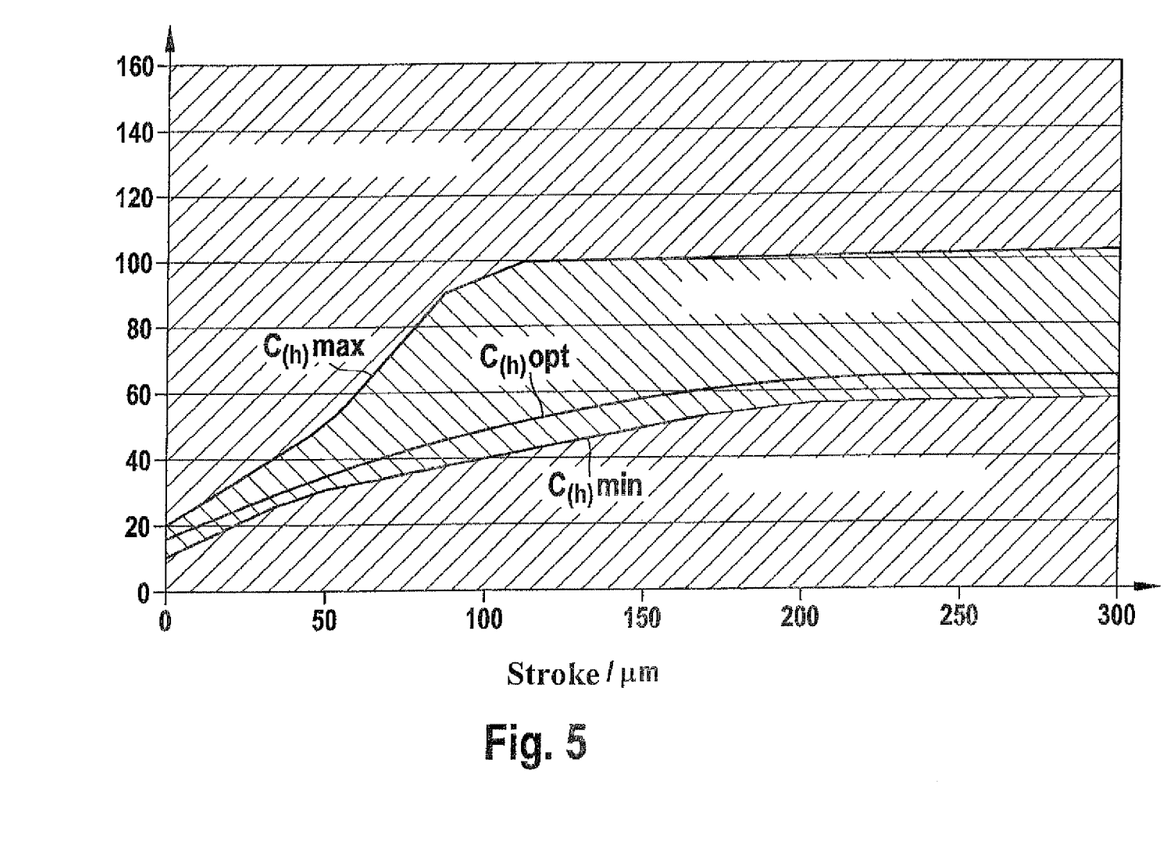
FIG. 5 shows a schematic course of a spring rate, which is variable over a stroke, of a restoring spring for a solenoid valve of the invention.

As can be seen from FIG. 5, a concrete behavior of the spring rate $C_{(h)}$, as a function of the stroke h, can be located between a minimum permitted course of the spring rate $C_{(h)}$min and a maximum permitted course of the spring rate $C_{(h)}$max. In addition, the graph in FIG. 5 shows an optimal course of the spring rate $C_{(h)}$opt. As can also be seen from FIG. 5, the optimal course of the spring rate $C_{(h)}$opt is preferably highly progressive at short strokes and ensures the existence of stable operating points for the corresponding solenoid valve of the invention.

Overall, with the solenoid valve of the invention, as a result of its continuous-action behavior, targeted and well-meterable pressure stages can be established over a wide current range. Because of the continuously variable stroke range of the solenoid valve of the invention, there is a markedly lesser pressure reduction, in comparison to a conventional on-off valve. Local pressure fluctuations that occur and greatly affect the incident noise are markedly reduced as well. With a valve current regulator that for instance evaluates a pressure sensor signal, the current course for generating the magnetic force $F_{magnetic}$ can be specified, so that desired set-point ramps for the pressure reduction in a wheel brake can be traversed without major deviations, and hence gentle wheel pressure regulations are possible. Moreover, the current intensity for supplying current to the magnet assembly can be established even without a pressure sensor. Thus the magnet assembly of the corresponding solenoid valve can, for instance for a brief pulse time, be supplied with variable current intensities, which can be adjusted for instance by specification of a pulse width modulation ratio (PWM ratio). In contrast to an on-off valve, the solenoid valve of the invention does not open fully but rather only up to a certain partial stroke, which is variable by means of the established current intensity. Thus more finely meterable pressure reduction stages are possible than with a purely on-off valve, and as a result the noise behavior can be improved as well.

The solenoid valve of the invention, which has a flow through it in the stroke-closing direction, advantageously has the advantages of continuous valves while at the same time preserving the advantages of an on-off valve that has a flow through it in the closing direction, such as tightness at arbitrary high pressures, fast valve reactions, and a low total force level.

The foregoing relates to the preferred exemplary embodiments of the invention, it being understood that other variants and embodiments thereof are possible within the spirit and scope of the invention, the latter being defined by the appended claims.

The invention claimed is:

1. A solenoid valve comprising:
a magnet assembly and a valve cartridge, the valve cartridge including a pole core, a valve insert connected to the pole core;
an axially movable armature guided axially movably inside the valve insert between a closed position and an open position, the armature being coupled to a closing element; and
a valve body connected to the valve insert, the valve body having a main valve seat which is disposed between at least one first flow opening and a second flow opening, and when current is supplied to the magnet assembly, the axially movable armature is moved in a direction toward the pole core by a generated magnetic force inside the valve insert which is counter to a spring force of a restoring spring and counter to a fluid force in order to lift the closing element out of the main valve seat and to enable a fluid flow between the at least one first flow opening and the second flow opening, and the axially movable armature is moved away from the pole core by the spring force of the restoring spring and by the fluid force inside the valve insert in order to press the closing element sealingly into the main valve seat and to interrupt the fluid flow between the at least one first flow opening and the second flow opening,
wherein the fluid flow between the at least one first flow opening and the second flow opening is in a stroke-closing direction,
wherein courses of the magnetic force, the spring force, and the fluid force are combined over a stroke course of the armature and the closing element in such a way that between a closed position and an open position of the armature and the closing element, at least one further stable operating point is established, which represents a point of force equilibrium with a negative total force gradient,
wherein the armature together with the closing element is movable by a partial stroke, by adjustment of a current intensity supplied to the magnet assembly, to lift the closing element out of the main valve seat and operate the solenoid valve in a quasi-stationary, partly open state, and
wherein the spring force is furnished by the spring rate of the restoring spring having a progressive course over the stroke course of the armature and of the closing element.

2. The solenoid valve as defined by claim 1, wherein the course, effected by supplying current to the magnet assembly, of the magnetic force is adjusted to be as flat as possible over the stroke course of the armature and of the closing element by means of geometric specifications for the armature and the pole core.

3. The solenoid valve as defined by claim 2, wherein the current intensity is adjustable by specification of a pulse width modulation ratio.

4. The solenoid valve as defined by claim 3, wherein the restoring spring for furnishing the spring force has a high spring constant.

5. The solenoid valve as defined by claim 4, wherein the course of the fluid force, effected by the fluid flow between the first flow opening and the second flow opening, is adjusted to be as flat as possible over the stroke course of the armature and the closing element by means of flow geometry specifications for the closing element and the main valve seat.

6. The solenoid valve as defined by claim 5, wherein the flat course of the fluid force over the stroke course of the armature and the closing element is specifiable by means of small opening angles between the closing element and the main valve seat.

7. The solenoid valve as defined by claim 6, wherein a sealing region of the closing element is embodied as a cone and a sealing region of the main valve seat is embodied as a hollow cone.

8. The solenoid valve as defined by claim 6, wherein a sealing region of the closing element is embodied as a ball, and a sealing region of the main valve seat is embodied as a hollow cone.

9. The solenoid valve as defined by claim 1, wherein the current intensity is adjustable by specification of a pulse width modulation ratio.

10. The solenoid valve as defined by claim 9, wherein the armature is embodied as a solenoid plunger defining at least one stage which overlaps with a correspondingly embodied pole core to form a single-stage or multi-stage plunger stage.

11. The solenoid valve as defined by claim 1, wherein the restoring spring for furnishing the spring force has a high spring constant.

12. The solenoid valve as defined by claim 1, wherein the course of the fluid force, effected by the fluid flow between the first flow opening and the second flow opening, is adjusted to be as flat as possible over the stroke course of the armature and the closing element by means of flow geometry specifications for the closing element and the main valve seat.

13. The solenoid valve as defined by claim 12 wherein the flat course of the fluid force over the stroke course of the armature and the closing element is specifiable by means of small opening angles between the closing element and the main valve seat.

14. The solenoid valve as defined by claim 1, wherein a sealing region of the closing element is embodied as a ball, and a sealing region of the main valve seat is embodied as a hollow cone.

15. The solenoid valve as defined by claim 1, wherein a sealing region of the closing element is embodied as a cone and a sealing region of the main valve seat is embodied as a hollow cone.

16. The solenoid valve as defined by claim 12, wherein the restoring spring is mounted within a cavity defined in at least one of the armature and the pole piece.

17. A solenoid valve, comprising:
a magnet assembly and a valve cartridge, the valve cartridge including a pole core, a valve insert connected to the pole core;
an axially movable armature guided axially movably inside the valve insert between a closed position and an open position, the armature being coupled to a closing element; and
a valve body connected to the valve insert, the valve body having a main valve seat which is disposed between at least one first flow opening and a second flow opening, and when current is supplied to the magnet assembly, the axially movable armature is moved in a direction toward the pole core by a generated magnetic force inside the valve insert which is counter to a spring force of a restoring spring and counter to a fluid force in order to lift the closing element out of the main valve seat and to enable a fluid flow between the at least one first flow opening and the second flow opening, and the axially movable armature is moved away from the pole core by the spring force of the restoring spring and by the fluid force inside the valve insert in order to press the closing element sealingly into the main valve seat and to interrupt the fluid flow between the at least one first flow opening and the second flow opening, wherein the fluid flow between the at least one first flow opening and the second flow opening is in a stroke-closing direction, wherein courses of the magnetic force, the spring force, and the fluid force are combined over a stroke course of the armature and the closing element in such a way that between a closed position and an open position of the armature and the closing element, at least one further stable operating point is established, which represents a point of force equilibrium with a negative total force gradient, wherein the armature together with the closing element is movable by a partial stroke, by adjustment of a current intensity supplied to the magnet assembly, to lift the closing element out of the main valve seat and operate the solenoid valve in a quasi-stationary, partly open state, and wherein the armature is embodied as a solenoid plunger defining at least two stages each of which overlaps with a correspondingly embodied pole core to form a multi-stage plunger stage.

18. The solenoid valve as defined by claim 17, wherein said at least two stages are configured to adjust the magnetic force to be as flat as possible over the stroke course of the armature and of the closing element.

* * * * *